Oct. 9, 1945.    E. A. BRINER    2,386,587
VARIABLE PITCH PROPELLER
Filed March 23, 1944    4 Sheets-Sheet 1

Emil A. Briner
INVENTOR

J. L. Chisholm
ATTORNEY

Oct. 9, 1945.  E. A. BRINER  2,386,587
VARIABLE PITCH PROPELLER
Filed March 23, 1944    4 Sheets-Sheet 2

Emil A. Briner INVENTOR

BY J. L. Chisholm ATTORNEY

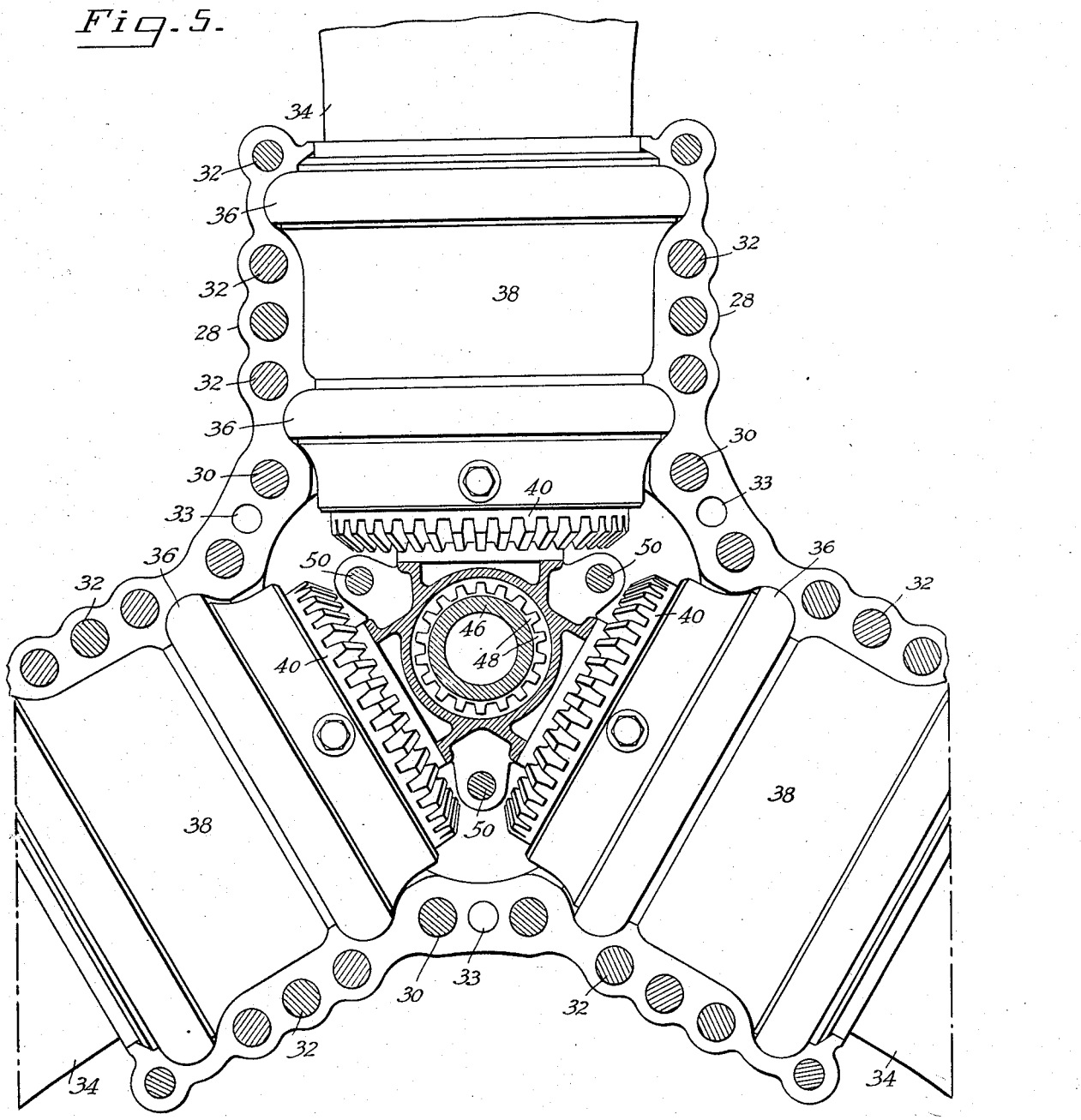

Patented Oct. 9, 1945

2,386,587

UNITED STATES PATENT OFFICE 2,386,587

VARIABLE PITCH PROPELLER

Emil A. Briner, East Orange, N. J., assignor to Aero Engineering Corporation, a corporation of New Jersey Application March 23, 1944, Serial No. 527,748

4 Claims. (Cl. 170—163)

This invention relates to airplane propellers and its purpose is to control the pitch of the propeller blades. Airplanes are customarily equipped with propellers the pitch of which can be varied in flight in order to develop the most effective propelling force under varying flight conditions, for example in air of different densities at varying altitudes and under other varying conditions of flight, such as taking off, cruising and landing.

In my Patent 1,982,284, dated November 27, 1934, I have shown a variable pitch propeller together with means for changing the pitch mechanically (as distinguished from electrically and hydraulically). In this arrangement, the blades are mounted in bearings in a hub and can be turned to any desired pitch by bevel gears which are secured to the roots of the blades and which are turned by other bevel gears and a cam in the form of a herringbone spline, all of which are mounted in the hub and rotate with it. The spline is shifted axially to turn the gear by rods set in the hub and connected to a ball bearing thrust collar surrounding the propeller shaft.

One of the heretofore unsolved problems in constructing pitch control devices of this character is to make a thrust collar for very large propellers, such as 2,000 horsepower, the weight of which justifies carrying it in a plane, and which is sufficiently compact to be installed in the available space, and which at the same time will carry the heavy thrust loads put upon it by the propeller. It has also been a problem to provide a thrust collar for such large propellers which can be easily operated to shift the pitch.

In my present invention, I have provided pitch changing mechanism in which these problems have been solved and I have also provided improved means for connecting the thrust collar to the pitch changing mechanism within the hub which is compact and which reliably carries the heavy thrust loads from the collar to the hub. Also I have discovered that my improved arrangement is substantially effective in damping eccentric or radial vibration of the propeller shaft. Accordingly another object of the invention is to provide a pitch-changing mechanism which damps or prevents radial vibration or whip of the propeller shaft.

In the accompanying drawings:

Fig. 5 is a section on the line 5—5 of Fig. 1.

Figure 1:
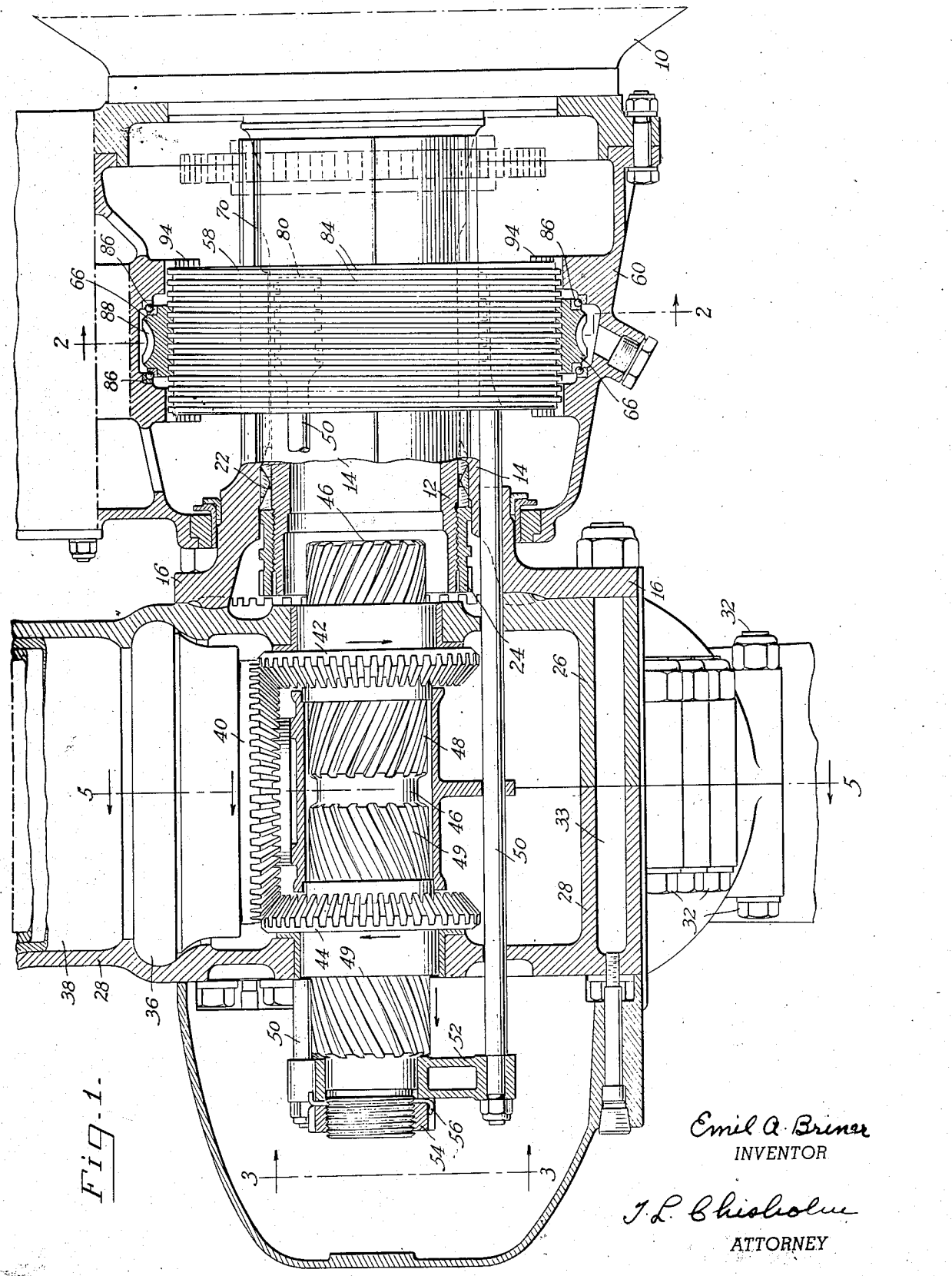
Fig. 1 is a longitudinal section through a variable pitch propeller hub and pitch changing mechanism constructed in accordance with my invention, certain interior rotary parts being shown in elevation.
Figure 2:
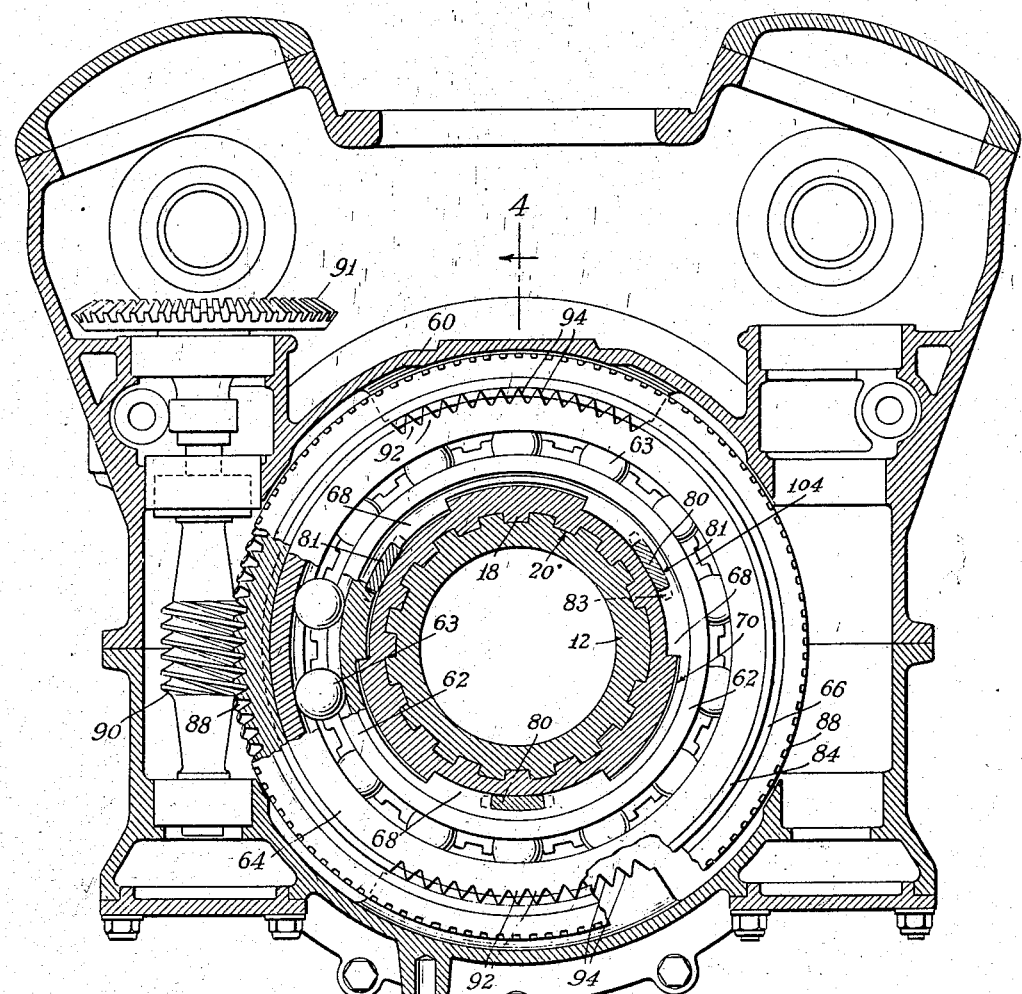
Fig. 2 is a section on the line 2—2 of Fig. 1.

Referring to Fig. 1, 10 designates a conventional airplane engine, having a propeller shaft 12 carrying a propeller sleeve 14, formed with a flange 16 constituting part of the propeller hub. As shown best in Figs. 2 and 4, the sleeve is keyed to the shaft by splines 18 fitting into corresponding grooves 20 of the shaft, and is held in place longitudinally on the shaft by the customary cones 22 and threaded collar 24 (Fig. 1).

Figure 3:
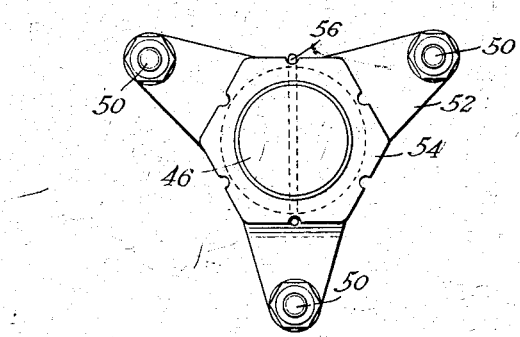
Fig. 3 is an elevation of the crosshead for the pitch-shifting cam, being a view on the line 3—3 of Fig. 1.

The hub includes the customary rear half 26 and front half 28 held together by bolts 30 and 32 (Figs. 1 and 5). The bolts 30 also serve to hold the hub on the flange 16. Lightening holes 33 may be provided if desired. When thus bolted together the hub forms three hollow arms for supporting three propeller blades 34. Suitable anti-friction bearings 36 are provided for the root 38 of each propeller blade and to each root is attached a bevel gear 40, as is well known in the art. Each of the gears 40 meshes with two gears 42 and 44 journaled respectively in the rear half and front half of the hub. Each of these latter gears has a central bore provided with helical grooves. The herringbone spline member 46 is mounted in these bores, its helical splines 48 and 49 sliding in corresponding helical grooves in the bores, as disclosed in my patent referred to. The arrangement is such that when the spline member is moved forward, that is to the left as seen in Fig. 1, the gear 44 is rotated counter-clockwise and the gear 42 is rotated clockwise, as seen from the left of Fig. 1 and this turns all of the blade roots clockwise, as seen from their tips. The spline member is prevented from rotating in order to accomplish this result by the opposite inclination of the splines 48 and 49. It is shifted axially by means of three rods 50 supported in the hub and fixed at their outboard ends to the spline member by means of the crosshead 52, best shown in Figs. 1 and 3, which is secured to the spline member by the nut 54 and cotter 56. The inboard ends of the rods are connected to a ball bearing thrust collar 58 by which they are shifted to move the spline. As so far described, the device has been known heretofore.

When the propeller is rotated centrifugal force tends to turn the blades to the flat position of zero pitch, because as the blades turn in their root bearings, points not on the axes of the blades vary their distance from the axis of the shaft, and these distances are at their maximum when the blades are transverse to the axis, substantially at zero pitch. In the case of large propellers at high speed this develops a heavy torque in the blades which is transmitted to the pitch-changing means as axial thrust. Consequently the pitch-changing means must be capable of providing a heavy opposing axial thrust, both to adjust the blades so as to increase pitch, and to hold them in adjustment.

In accordance with my present invention, I provide improved means for shifting the spline member 46 and for holding it in any desired position against the inherent torque of the propeller blades which tends to turn them to the no-pitch position.

Figure 4:
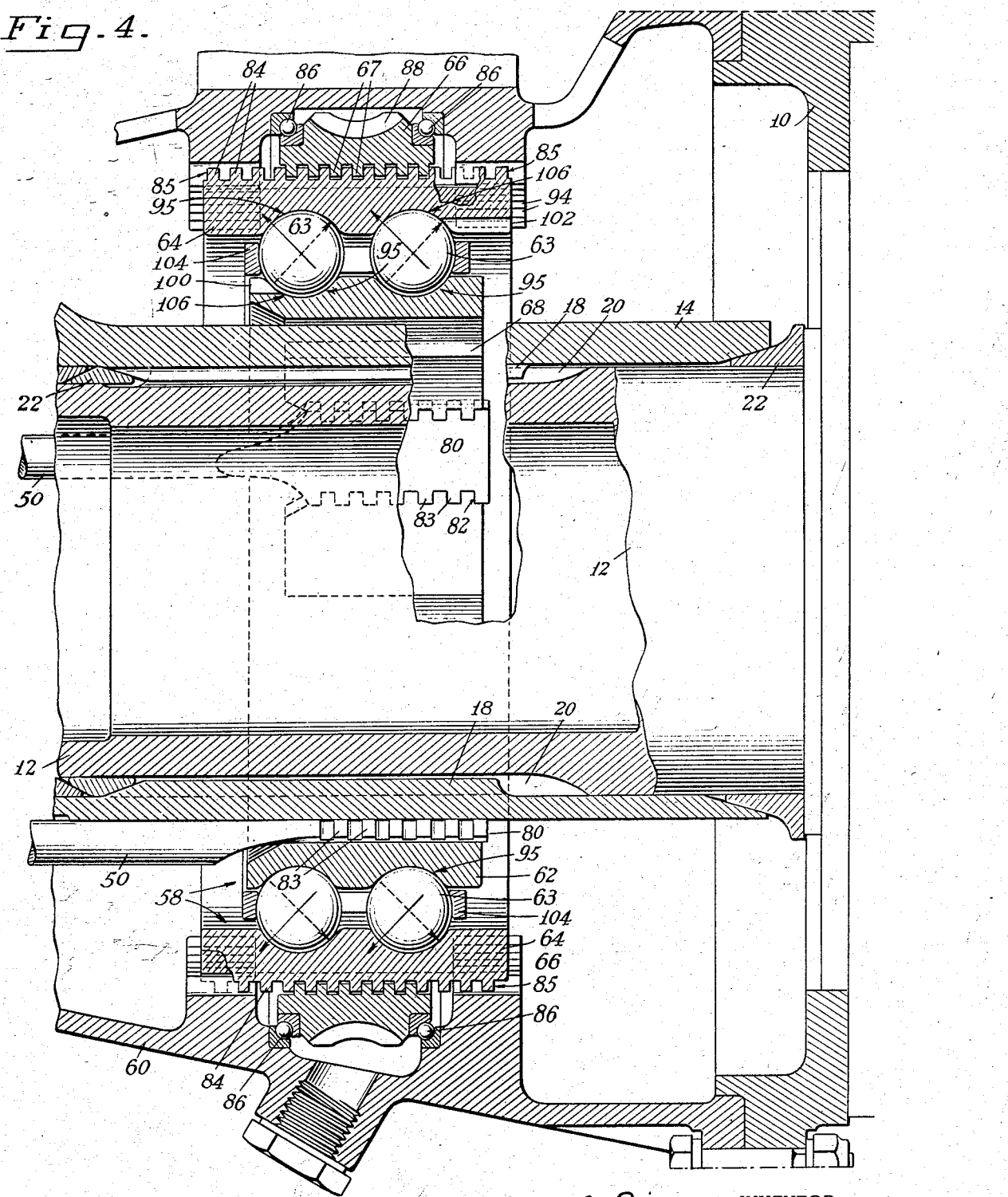
Fig. 4 is an enlarged section taken on the line 4—4 of Fig. 2, partly broken away.

The engine casing 10 is provided with a housing 60 in which the shift collar 58 and its operating mechanism are mounted. The shift collar is primarily a ball bearing including an inner bearing race 62 rotating with the engine shaft and slidable on it, balls 63, an outer bearing race 64 supported by the casing 60 so as to be slidable axially but not rotatable. A worm-driven nut 66 having threads 67 shifts the collar 58 along the shaft to change the pitch of the blades. The inner race 62 is constrained to rotate with the propeller and with the rods 50 by being splined to the sleeve 14 by wide splines 68 (Fig. 2) fitting in grooves 70 in the sleeve. The fit of the splines permits the bearing to slide freely along the sleeve. The inner race 62 is attached to the ends of the pitch-shifting rods 50, the ends 80 of which for this purpose are circumferentially wide and radially thin and are received in grooves 81 in the inner face of the bearing race adjacent the sleeve 14 (Fig. 4). Both edges of each groove 81 have recesses 82 which receive corresponding teeth 83 on the rods 50. This provides a radially thin, compact and secure fastening capable of carrying the thrust load of the blade torque without binding or jamming.

The outer surface of the outer bearing race 64 is provided with a square or flat thread 84 having a helical surface 85 which is perpendicular to the axis of the bearing. This thread engages the corresponding square thread 67 in the nut 66 with the customary slight axial clearance to permit normal operation without binding. The threads have a low pitch angle, not more than 2°, and have abnormally large or substantial radial clearance, shown in Fig. 4, to permit slight radial movement of the outer race 64. The thread surfaces 85 extend radially a substantial distance to provide extensive friction surfaces engaging the nut, to damp vibration as will be explained. The nut is mounted in two ball bearings 86 so arranged that force transmitted from one race to the other through the bearing balls acts on lines lying between 35° and 55°, and preferably at 45° to the axis of the bearing, that is the lines of force constitute elements of cones having angles between 35° and 55° which, for the purposes of this application, are defined as cones of about 45°. The bearings act in opposite directions, that is the cones of force of the two bearings intersect between the bearings. This arrangement prevents both radial and axial movement of the nut by allowing all radial clearance of the bearings 86 to be taken up by axial shims.

The outer face of the nut is formed with a worm wheel 88 which is rotated by a worm 90 (Fig. 2) actuated by a gear 91 driven by any suitable means, not shown. The outer race 64 is provided with spline teeth 92 (Fig. 2) cut axially in its threaded surface. The teeth are slidable in grooves 94 in the housing 60, so that the outer bearing race cannot rotate with the nut 66 but is constrained to be axially shifted by the threads 67 when the nut is rotated by the worm.

The bearing per se of the ball bearing collar 58 is of special construction to fulfill the purposes of my invention, and is both a radial and thrust bearing. Each race is a single integral member having a pair of raceways 95, for receiving the bearing balls 63, so arranged that the two raceways in each race transmit thrust in the same direction simultaneously. Thus each row of balls carries half the thrust. This sharply reduces both the diameter and weight of a bearing required to carry a given thrust load. I am aware that it has been proposed to divide a bearing load by using several rows of bearing balls, but in the instances with which I am familiar these have been in separate bearing races and it has been difficult or impossible to get each independent bearing to carry its share of the load, or even to tell whether the load was divided or was all on one bearing. I am aware that bearings have been made with two rows of balls in an integral race, but in those bearings which have come to my attention both rows cannot exert axial thrust at the same time nor in the same direction. The bearings are arranged to transmit the thrust load from one race to another at about 45° to the axis of the bearing, that is along the elements of cones of about 45°, which as previously explained may vary between 35° and 55°. This arrangement provides a thrust bearing having no radial play or looseness, and this makes possible the damping of shaft vibration through the square threaded nut 66.

It has been discovered that propeller shafts of the character here illustrated may have an eccentric whip, which may result in a radial movement of as much as twenty thousandths of an inch. This produces severe vibration. Also the propeller itself is supported so far from the shaft bearing that appreciable bending moments are set up in the shaft by the gyroscopic effect of the rotating propeller whenever the plane is sharply turned. The invention provides means for resisting this radial movement and damping the vibration which would be caused by it. As has been explained, the centrifugal forces on the propeller blades tending to turn them to the zero pitch position transmit a heavy thrust to the bearing 62. This is taken up by the radial surfaces of the square-threaded nut and bearing race. The total area of the helical surface of the threads of the nut provides a radial surface of extended area in engagement with a similar surface on the outside bearing race 64. The nut and bearing are so constructed and fitted that the bearing can move radially .020 inch or more in the nut, the nut being held firmly against radial movement by the 45° bearings 86. Thus the radial surfaces of the threads, under the load of the thrust of the torque of the blades, form friction damping surfaces which permit, but resist, relative movement and thus tend to damp vibration caused by such movement.

Since the blades when rotating inherently tend to turn to the flat position of zero-pitch all of the force holding the blades in a position of positive pitch, or the force increasing the positive pitch will be in one direction, for instance in the direction to place the rods 50 in tension and exert force on the outer bearing race as indicated by the solid arrows in Fig. 4. Consequently the bearing is constructed so that both rows of balls act on raceways at about 45° toward the left. This can be accomplished by forming the grooves or raceways as shown in Fig. 4, making the single loading slot for the front row of balls in the inner raceway as at 100, and the single loading slot for the back row in the outer raceway as at 102. The balls are inserted in these slots and placed between the races when the bearing is assembled. If desired, spacing or retainer rings 104 may be used.

Since it may be desired to reverse the pitch of the propeller blades to brake the plane after landing or in maneuvering, the bearing must be able to transmit thrust in the opposite direction, indicated by the broken arrows in Fig. 4. To this end the loading slots are not as deep as the grooves, leaving surfaces as at 106 which permit the bearing to transmit sufficient load in the reverse direction. Only one ball at a time being opposite a slot, the greater portion of the load is taken by the balls which are away from the slot, and the surfaces 106 consequently have only a small load to sustain.

My arrangement provides a simple, compact and rugged means for transmitting pitch-shifting thrust to very large propellers. Rotation of the worm 90 can be accomplished by hand, or by power driven devices in any suitable way. Rotation of the nut 66 in the anti-friction bearings 86 shifts the outer bearing race 64 to move axially the entire bearing collar, rods 50 and herringbone spline member 46 and thus turn the propeller blades against large torque. The pitch of the threads 67 is so small, being not more than 2°, that no axial thrust encountered in practice can rotate the nut 66 even under engine vibration of the types not damped by the nut threads. Consequently the nut acts as a positive pitch lock.

I claim:

1. In a pitch control device for variable pitch propellers, the combination of a rotatable support for a propeller hub, a slidable pitch adjusting member carried by and rotatable with the support, means for shifting the pitch adjusting member axially including an inner bearing race splined to the support, a stationary casing, an outer bearing race splined to the casing, bearing balls between the races, the races being constructed to transmit thrust between the races and through the balls along lines which constitute elements of a cone of about 45°, the outer surface of the outer race being threaded, a nut in threaded engagement with the outer race, means for rotating the nut to move the bearing axially, and means for preventing axial and radial movement of the nut, the threads of the nut and outer race having engaging helical surfaces perpendicular to the axis of the shaft, the threads having normal axial clearance to permit normal rotation, without binding and there being substantially greater radial clearance between the nut and outer race than the axial clearance whereby said engaging surfaces of the nut and outer race under axial load of the pitch shifting means damp eccentric movement of the support.

2. In a pitch control device for variable pitch propellers, the combination of a support for a propeller hub, axially movable means carried by the support for adjusting propeller pitch and an axially adjustable thrust collar connected to said adjusting means including a single integral bearing race splined to the support and a single integral outer bearing race axially movable with respect to the support and non-rotatably supported, each of said races having a plurality of raceways, a plurality of rows of bearing balls in the raceways, the races being constructed and arranged to transmit thrust between the races through both rows of balls simultaneously along the elements of cones of about 45°, a nut surrounding the outer race and in square threaded engagement therewith, said nut having normal axial clearance from the outer race to permit normal rotation without binding and substantially greater radial clearance from the outer race to permit substantial axial movement of the outer race with respect to the nut and means for preventing radial and axial movement of the nut to damp eccentric vibrations of the support including a pair of ball bearings arranged to transmit thrust along the elements of intersecting cones of about 45°.

3. In a pitch control device for variable pitch propellers, the combination of a rotary hub for supporting variable pitch blades, a rotary support for the hub, axially movable means in the hub for positioning propeller blades to determine their pitch, a plurality of rods secured to said means and disposed outside of said support and means for shifting the rods axially, against the inherent force of the blades tending to move to low-pitch position said last mentioned means including an inner bearing race secured to the rods and splined to the support, an outer race connected to the inner race by bearing balls, and means for axially shifting the outer race, said shifting means including means for damping eccentric vibrations of the support, said damping means including a plurality of radial surfaces on said outer race, a plurality of radial surfaces fixed with respect to radial movement and engaging the said first mentioned surfaces under the friction load of the pitch shifting means said outer race and said fixed radial surfaces being constructed and arranged to permit substantial relative radial movement while said surfaces are in contact.

4. The combination of a rotary power transmitting shaft and means for damping radial vibrations of the shaft, including a member carried by the shaft having a radial surface, a second member fixed with respect to radial movement and having a radial surface engaging the first mentioned surface, said shaft and first mentioned radial surface being radially movable through a substantial distance with respect to said second member and second radial surface, means urging the surfaces into frictional engagement, and an anti-friction rotary bearing between the shaft and the first mentioned member, said first-mentioned member being axially movable with respect to the shaft while maintaining the frictional engagement of said surfaces.

EMIL A. BRINER.